Patented June 17, 1941

2,246,387

UNITED STATES PATENT OFFICE 2,246,387

SINTERED HARD METAL ALLOY, IN PARTICULAR FOR TOOLS

Paul Schwarzkopf, Yonkers, N. Y., assignor to American Cutting Alloys, Inc., Yonkers, N. Y., a corporation of Delaware No Drawing. Continuation of application Serial No. 202,436, April 16, 1938. This application February 8, 1941, Serial No. 378,054. In Germany May 16, 1929

1 Claim. (Cl. 75—136)

This invention relates to a sintered hard metal alloy, in particular for tools and working appliances.

This application forms a continuation of my application Ser. No. 202,436, filed April 16, 1938, and a continuation in part of my copending patent applications Serial Numbers 743,717, filed September 12, 1934, and 727,781, filed May 26, 1934, which in turn was copending with my application Serial Number 625,042, now Patent 2,091,017, dated August 24, 1937, which in turn was copending with my application Serial Number 452,132, filed May 13, 1930.

It is an object of the invention to provide a hard metal alloy, particularly for tools, which is capable of machining forged as well as cast metal, in particular steel and iron.

It is another object of the invention to provide a hard metal, in particular for tools, which is capable of machining material at relatively low speed, great depth of cut and large feed, or at relatively high speed with smaller depth of cut and speed.

It is another object of the invention to provide for a hard metal, particularly for tools, which is capable of being used during a relatively long period of time without regrinding.

It is still another object of the invention to provide for tools which can be used for machining different kinds of steel and iron, or other materials, such as glass and artificial resins, which are either forming long chips or are splintering when machined.

It is a further object of the invention to provide for a hard metal alloy, particularly for tools, which is usable for mere cutting as well as mere shearing and grinding action, the latter particularly at very high speed.

The hard metal alloy according to the invention can be used for tools of any kind, such as cutting, boring, drilling, planing, milling, etc., tools.

According to the present invention the cemented and sintered hard metal composition for tools and other working appliances and parts thereof consists of about 4% titanium carbide and about 86% tungsten carbide in substantially monophasic solid solution, balance essentially metal of the iron group.

The hard metal composition according to the invention can be manufactured by first forming solid solutions of tungsten carbide and titanium carbide in the approximate ratio stated by heating a powdery mixture thereof to temperatures of about 1600° C. to 2000° C., comminuting the crystalline carbide substances so obtained, admixing it with powdery auxiliary metal, preferably cobalt, and sintering the mix until a dense and tough body is obtained. Instead, tungsten carbide, titanium carbide and auxiliary metal in the approximate ratios stated can be intimately admixed and sintered until a dense and tough body is obtained and the tungsten carbide and titanium carbide are substantially compounded to form monophasic homogeneous carbide crystal structures or solid solutions.

In producing the hard metal composition according to the invention, the carbide structures and auxiliary metal are advantageously ground to sufficiently small size of their particles, e. g. about 3 to 20 microns average diameter and intimately and thoroughly mixed in ball mills. The mix is thereafter shaped by molding under pressure, presintered and machined to exact shape, if desired. Final sintering should be performed within a temperature range of about 1400° to 1600° C. during a sufficient period of time, preferably one to four hours.

How ever the hard metal composition according to the invention is manufactured it finally contains the two carbides substantially in a single carbide phase, and the grain size of the carbide substance will not materially exceed that of the component carbides of the initial mixture. In other words, no substantial recrystallisation can be observed.

Desired conditions can thus be imparted to the finished cemented hard metal composition to a degree highly surpassing that obtainable with other compositions, as to grain size, hardness and machining qualities.

Another substantial advantage of the invention consists in that there are practically no oxides formed or retained on the surface of the carbides. It appears that with formation of the solid solution a kind of self-cleaning of the surfaces of the individual carbides going into monophasic solution is effected, and an oxide film, if still formed or retained, is at least considerably thinner and less detrimental than one observed on individual carbide crystals. This effect of even very small additions of titanium carbide as suggested by the invention is of great practical importance because numerous comparative experiments showed that the thinner the oxide films, if any, covering the carbides are, the denser is the final cemented alloy, the smaller are the pores to be established under the microscope, and the better is the bond between the carbide grains and the cementing metal.

In addition, as is well known in the art, by the presence of solid solutions of the carbides concerned, the average hardness of the final hard metal composition is increased.

It is understood that the advantages of the invention outlined above can be obtained to a considerable extent if besides a monophased carbide solution as a substantial portion of the final cemented hard metal composition and preferably amounting to 60% to 75% thereof, single carbide is present. Also in such a case the carbide substance present is highly resistant against oxidation at high working temperatures in open air and under the action of cooling water. The titanium carbide though present in small amount but substantially monophasic solid solution with the other carbide, increases the corrosion resistance of the latter. Moreover, titanium carbide is relatively inexpensive and of comparatively low specific weight.

With a tool provided with a hard metal tip according to the invention consisting of about 4% titanium carbide, 10% cobalt, balance tungsten carbide, the following results have been obtained.

Steel having a tensile strength of 90,625 lbs. per square inch has been turned with a speed of 50 ft. per minute and a feed of $\frac{1}{25}''$ per revolution and a depth of cut of $\frac{3}{15}''$. If the speed were increased to 185 ft. per minute, still a feed of $\frac{1}{10}''$ per revolution and the same depth of cut could be obtained. Regrinding of the tool was not required until after several hours of operation.

In another experiment steel having a tensile strength of 125,000 lbs. per square inch has been turned with a speed of 100 ft. per minute, a feed of $\frac{1}{25}''$ and a depth of cut of $\frac{1}{4}''$; furthermore, at a speed of 180 ft. per minute, a feed of $\frac{1}{8}''$ per revolution and a depth of cut of $\frac{2}{5}''$. Again, after several hours of operation the tool was still fit for use and did not require regrinding.

In another experiment chromium-nickel steel containing 4.5% nickel and treated to have a tensile strength of 140,725 lbs. per square inch could be turned with a speed of 56 ft. per minute, a feed of $\frac{3}{20}''$ per revolution and a depth of cut of $\frac{1}{5}''$.

In all of the cases referred to above, high-speed steel has been used up to date, which did not permit economic manufacture, compared with that performed with a tool according to the present invention. Thus, for instance, cast steel cylinders required 7 to 8 hours for turning to measurement with high-speed tools. If the latter were replaced by tools according to the invention, the identical work could be finished within 70 minutes. For turning a cast steel workpiece having a bad surface including holes and sand, it was necessary to regrind a high-speed steel tool up to 25 times whereas in performing the same work with a tool according to the invention, the entire work could be finished without regrinding the tool.

Particular difficulties were experienced when turning an eccentric piece of steel. Turning it with a high-speed tool of best quality available, a speed of 40 ft. per minute, a feed of $\frac{1}{20}''$ per revolution and a depth of cut varying between $\frac{1}{5}''$ to $\frac{2}{5}''$ due to the eccentricity of the workpiece, could be reached. Doing the same work with a tool according to the invention, a speed of 110 ft. per minute, a feed of $\frac{3}{40}''$ could be obtained, while the depth of cut was the same.

The advantages of the hard metal alloy according to the invention consist, among others, therein that the work can be done in a more economical way, the speed can be considerably increased compared with high-speed steel, and the amount of valuable alloy consumed during the work is reduced. In other words, the amount, e. g. of valuable tungsten, or cobalt used up while chipping a unit of a given material to be machined, is considerably reduced when compared with the amount of tungsten and cobalt used up for chipping the same unit of the same material by means of a carbon-free high-speed tool consisting, e. g. of chromium, tungsten and cobalt as main constituents.

With a hard metal alloy according to the invention in particular materials forming long chips can be worked, such as steel alloys of any kind, such work, including turning, milling and planing performed at a speed between about 30 ft. and 200 ft. per minute and a feed between about $\frac{1}{15}''$ to $\frac{1}{5}''$ per revolution. With other hard metal alloys known up to date, one obtained feeds below $\frac{1}{20}''$ as a maximum, whereas feeds of $\frac{1}{12}''$ to $\frac{1}{8}''$ per revolution are used on the average with a hard metal alloy according to the present invention. Known hard metal alloys did not stand up, even at reduced speed, in a manner comparable with the invention, nor can that be said of the best carbon-free high-speed tools composed of chromium, cobalt and tungsten.

What I claim is:

A sintered hard metal composition, in particular for tools and other working appliances and parts thereof, substantially consisting of about 4% titanium carbide and about 86% tungsten carbide in substantially monophasic solid solution, balance essentially metal of the iron group.

PAUL SCHWARZKOPF.